United States Patent [19]

Jones, III

[11] Patent Number: 4,631,136
[45] Date of Patent: Dec. 23, 1986

[54] NON-POLLUTING NON-TOXIC DRILLING FLUID COMPOSITIONS AND METHOD OF PREPARATION

[76] Inventor: Reed W. Jones, III, 1114 W. Hull St., Denison, Tex. 75020

[21] Appl. No.: 702,077

[22] Filed: Feb. 15, 1985

[51] Int. Cl.$^4$ .................................................. C09K 7/06
[52] U.S. Cl. ............................. 252/8.5 M; 252/8.511; 252/8.551
[58] Field of Search ........... 252/8.5 M, 8.5 P, 8.55 R; 260/398.5

[56] References Cited

U.S. PATENT DOCUMENTS

| | | | |
|---|---|---|---|
| 2,442,120 | 5/1945 | Duke . | |
| 2,661,334 | 12/1953 | Lummus | 252/8.5 |
| 2,759,829 | 8/1956 | Mattil et al. | 260/398.5 X |
| 2,876,197 | 3/1959 | Watkins | 252/8.5 |
| 2,943,051 | 6/1960 | Lummus | 252/8.5 |
| 3,047,493 | 7/1962 | Rosenberg | 252/8.5 |
| 3,252,903 | 5/1966 | Crittendon | 252/8.5 |
| 3,284,352 | 11/1966 | Burdyn et al. . | |
| 3,318,819 | 5/1967 | Tribble et al. | 260/398.5 X |
| 3,328,492 | 5/1967 | Gleason et al. . | |
| 3,497,535 | 2/1970 | Lennon | 260/398.5 |
| 3,761,410 | 3/1971 | Mondshine et al. . | |
| 3,873,466 | 3/1975 | Wright | 260/398.5 X |
| 4,342,866 | 8/1982 | Kang et al. . | |
| 4,374,737 | 2/1983 | Larson et al. . | |
| 4,411,801 | 10/1983 | Pomerleau et al. . | |
| 4,425,463 | 1/1984 | Walker et al. . | |

*Primary Examiner*—Herbert B. Guynn
*Attorney, Agent, or Firm*—Michael A. O'Neil

[57] ABSTRACT

The present invention relates to plant or vegetable oil-based drilling fluid compositions which are non-polluting and non-toxic, and which provide improved lubricating properties and stability for use under widely-varying load and pressure drilling conditions. The compositions are primarily based on plant or vegetable oils comprising essentially extended long-chain carboxylic acids having minimal double and triple bonds of the 12 to 24 carbon atom series. The oils are selected from the group consisting of peanut oil, rapeseed oil, soybean oil, sunflower oil, corn oil, cottonseed oil, rice bran oil, safflower oil, castor bean oil, palm oil and mixtures thereof. Suitable antioxidants and emulsifiers as well as desired viscosifiers and fillers are included in the compositions which are adapted to addition to water and/or brine for desired rheological properties for drilling fluid uses.

The compositions are free of aromatics and petroleum based derivatives, the natural oils bieng emulsified with chemically-similar constituents for long-term stability and multiple drilling uses.

6 Claims, No Drawings

NON-POLLUTING NON-TOXIC DRILLING FLUID COMPOSITIONS AND METHOD OF PREPARATION

BACKGROUND OF THE INVENTION

1. Technical Field

This invention relates to drilling fluids for use in various drilling methods and to novel lubricating drilling fluid compositions for use in widely varying drilling procedures. The invention is particularly concerned with non-polluting non-toxic biodegradable drilling fluids which are based on plant and vegetable oils and are applicable to emulsified addition to water to form natural water in oil based drilling fluids having improved lubricating characteristics under both high and low load and pressure conditions. The fluids are useful in both variable load and extreme operating conditions such as evidenced by changes in the drag of the drill pipe which occurs during drilling in severe conditions, during vertical movement of the drill pipe into and out of the drill hole such as to change the drill bit, increases in bit balling, and increases in the tendency of the drill pipe to become stuck. The fluids are natural oil based and exhibit non-toxicity toward aquatic life and possess valuable rheological properties as disclosed hereinafter.

2. Prior Art

In the drilling of wells to recover hydrocarbons such as oil and/or gas from subterranean deposits, it is common practice to use a rotary drilling procedure in which a drill bit is rotated at the bottom of the bore hole by means of rotating hollow drill pipe which extends to the surface. The drill pipe is driven from the surface and a circulating fluid commonly referred to as a drilling fluid or drilling mud is pumped through the drill pipe where it emerges through openings in the drill bit to cool the same and is returned to the surface in the annular space between the drill pipe and the walls of the bore hole.

The drilling fluid, upon emerging from the well at the surface, may be mechanically processed to remove the cuttings and other undesirable contaminants and is normally treated chemically to maintain certain chemical and physical properties of the fluid depending upon particular drilling conditions encountered. The drilling fluid after being reconstituted is normally recirculated by pumps to be forced downwardly through the drill pipe, this circulaton being generally continuous during drilling. Circulation of the drilling fluid may be interrupted occasionally such as when an additional section of drill pipe is added at the top of the string of pipe or when the entire length of drill pipe is withdrawn to replace or repair the drill bit.

The drilling fluid must be capable of performing many varied functions which are required in a successful drilling procedure and therefore must possess certain desirable chemical and physical properties. The drilling fluid must have sufficient viscosity to suspend and remove the cuttings from the bore hole and must have sufficient gel strength to hold solids in suspension, especially when circulation of the fluid is interrupted. It also must have sufficient density to exert suitable pressure to the sides of the bore hole to prevent the entrance of fluids into the bore hole from the earth formation being penetrated, and it must have low fluid loss to prevent undue loss of fluid into the formation by its deposition on the bore hole sides such as by forming an impervious filter cake or deposit. Further, it must lubricate both the bearing and cutting surfaces of the drill bit as well as the string of drill pipe both upon rotation and vertical movement. Frequently, in the drilling of wells and especially in directional drilling, the friction between the string of drill pipe and the sides of the bore hole may be sufficient to interfere with vertical movement of the pipe into and out of the hole. Such high friction between the drill pipe and the bore hole increases power required to rotate the drill pipe and the increased torque causes wear and stress on the pipe thus decreasing the drilling rate and causing the possibility of pipe twist-off or breakage.

The lubrication characteristics of drilling fluids have been the subject of many investigations, most prior art patents disclosing different types of additives for use in petroleum oil base drilling fluids, water-in-oil emulsion drilling fluids, and water base drilling fluids. Also, it has been proposed to incorporate an emulsifier in water base drilling fluids where the lubricating additive is insoluble in water. Many of the prior art additives function as extreme pressure lubricants and are added to the drilling fluid primarily to lubricate the bearings of the drill bit. Some of the known prior art additives also serve to impart sufficient lubricity to the drilling fluid to decrease the power required to rotate the drill pipe by reducing the drill string torque. These additives serve to decrease the friction occurring between the drill string and the sides of the bore hole thus increasing the lubricity of the drilling fluid.

Many of the in oil type drilling fluids having lubricating characteristics have been based upon mineral oils or diesel oil with the addition of additives therein to effect an emulsion. Pollution and toxic features of such materials are becoming increasingly objectional which limit their effectiveness. Also, some of the prior art additives are not effective at a pH above about 10.5 and others are not effective in the presence of calcium or other polyvalent cations. In addition, certain of the additives are absorbed onto the surface of the solids present in or carried by the drilling fluid which may deactivate the additive and may cause oil wetting of the solids resulting in fluctuation and settling, especially if barite is present as the weighting material. Certain additives cause the drilling fluid to foam while others are difficult to disperse in the drilling fluid. Others cause the drilling fluid to fluoresce under ultraviolet light which interferes with certain well logging operations performed to indicate the presence of oil in the earth formations being penetrated. Also, some of the additives must be employed in such great concentrations to be ineffective from the standpoint of economics.

As is known in current practice, drilling muds based on diesel fuel oil and the like have been the primary medium for providing lubricants to the drill pipe in drilling for hydrocarbons. One major disadvantage in using such materials has been in drilling offshore and in lakes or wetlands, their polluting characteristics having caused severe logistics problems. Such diesel fuel based fluids cannot be disposed of in the ocean or lakes due to environmental and pollution concerns and their adverse effect on aquatic life. In such cases the diesel fuel containing fluids must be transported ashore to a suitable type of disposal or recovery system. Increasingly stringent regulation of the adverse environmental effects of diesel oil in drilling fluids requires the development of non-polluting replacements. Pollution has usually been defined as a sheen, film or discoloration of surface water adjoining shorelines such as formed by petroleum-based oils and is prohibited.

U.S. Pat. Nos. 2,222,949, 2,316,967, 2,316,968 and 2,698,833 primarily relate to oil-base, non-aqueous drilling fluids all of which are inherently polluting. U.S. Pat. No. 2,698,833 is directed to a drilling fluid which is prepared with a thermally stable oil having less than about 5% aromatics and unsaturates by volume to be non-fluorescing. However, it still possesses objectionable polluting properties.

U.S. Pat. No. 3,761,410 discloses water based drilling fluid with increased lubricity, the water being dispersed as discreet small non-emulsified droplets in the fluid. This composition includes water insoluble alkyl alcohol, a lubricating additive consisting of a vegetable oil or tall oil and a pour point depressant consisting of an alcohol or glycol.

U.S. Pat. No. 4,374,737 disloses a drilling mud composition for mixing with water which comprises major amounts of diethanolamine, tall oil fatty acid and imidazoline/amide mixture with a biodegradable non-polluting vegetable oil comprising a minor amount of the composition, the latter to act as an emulsifier when the composition is added to water. These fluids are described as not requiring additional emulsifiers to maintain the emulsion and possessing desired rheological properties comparable to those obtained with crude or diesel oil; however, they do require major amounts of the concentrate.

SUMMARY OF THE INVENTION

The present invention relates to non-polluting non-toxic lubricating drilling fluid compositions which are emulsified and based upon plant or vegetable oils having extended carboxylic acids with C-12 to C-24 carbon chains. The preferred oils are those having minimal double and triple carbon bonds to which are added certain antioxidants, emulsifiers and wetting agents, the latter two primarily of the oleate type. To fulfill all the desired chemical and physical properties of preferred drilling fluids, water or brine, as well as certain filler or weighting materials, may be added to the compositions in order to permit their functional performance in a wide variety of drilling conditions. The subject lubricating fluids are based on natural oils and exhibit an extremely high lubricity while being biodegradable and non-toxic to sea and animal life.

The subject drilling fluids are improved compositions for servicing a well during drilling, fracturing and completion operations by circulating the same in the well bore. The fluids are capable of providing improved lubrication to the drill bit as well as imposing a hydrostatic head in the drilled formation to prevent escape of oil, gas or water into the well bore hole during the drilling operation. The compositions are a low solids stable-water-in-oil emulsion-type drilling fluids which are non-toxic and effective for coating the well bore wall surfaces and retarding hydration of susceptible formation materials. Tests of the fluids on marine life such as mysid shrimp have shown outstanding survivability of such sea life when the fluids are present in sea water in appreciable quantities.

DESCRIPTION OF THE PREFERRED EMBODIMENT

This disclosure relates to non-toxic oil base drilling fluids which are capable of widely varying additional functions of a drilling fluid such as a spotting fluid, packer fluid, coring fluid, completion fluid and lubricating fluid. The subject drilling fluids have relatively non-toxic emulsifiers especially selected for each component of the compositions with suitable viscosity control agents, density and supporting agents for the drilling of wells for oil, gas, mining and geothermal deposits.

The non-toxic oils which are biodegradable are those which can be obtained from any plant or vegetable origin that has a relative mixture of extended long chain carboxylic acids. The carboxylic acids employed to formulate the blends can be obtained from any commercial source such as peanuts, rapeseed, rice bran, safflower, soybean, sunflower, corn, cottonseed, castor bean and palm. These oils are preferably blended to eliminate or decrease the double and triple carbon bonds which exist in some of the prescribed oils in their normal chemical states. The preferred range of carbon chain length is from C-12 to C-24 carbon atoms. The following table indicates the preferred oils which can be used in the present invention:

| CARBON NO. | RANGES | CARBON NAME |
|---|---|---|
| C12 | 3-50% | Lauric Acid |
| C14 | .5-20% | Myristic |
| C16 | 3-35% | Palmitic |
| C17 | 0-5% | Margaric |
| C18 | 1.5-6% | Stearic |
| C18:1 | 12-85% | Oleic |
| C18:2 | 15-85% | Linoleic |
| C18:3 | .2-10% | Linolenic |
| C20 | .2-10% | Arachidic |
| C20:1 | 1.5%-35% | Eicosenoic |
| C22 | 1.5-25% | Docosenic |

As is known, natural oils having double and triple carbon bonds exhibit a tendency to oxidize in use or upon heating which leads to polymerization. The addition of antioxidants reduces or eliminates this problem, the antioxidants being added to the oils in minor amounts. The antioxidants are selected from the groups consisting of p-phenylenediamines, secondary arlyamines, alkylarylamines, ketone amine, dihydroquinolines, alkylated phenols, phosphite esters, and alkylated phenol sulfides, which are chemically compatible with the selected oils.

The preferred naturally-occurring oils are plant and vegetable oils comprising extended long-chain carboxylic acids having minimal double and triple carbon bonds. One preferred mixture comprises peanut oil and rapeseed oil, each ranging in amount from about 10 to 90 percent by weight. The mixture may more specifically contain about 55% by weight peanut oil and about 45% by weight rapeseed oil.

The preferred antioxidants employed are 2, 6, di-tert-butyl-p-cresol, butylated-hydroxy-anisole (BHA), butylated-hydroxy-toluene (BHT), tert-butyl-hydroquinone (TBHQ). The range of the antioxidant employed with the prescribed oil varies from about 0.015 to 3.8% by weight depending upon the antioxidant used which is initially added to the base oil mixture with thorough mixing during formulation of the compositions. Antioxidants or inhibitors appreciably decrease the rate of oxidative deterioration of the oils. Commonly used antioxidants are substitution derivatives of phenol, such as the aforesaid 2, 6, -di-tert-butyl-p-cresol, which is preferred, as well as o-cyclo-hexylphenol and p-phenylphenol.

A synergist for the antioxidants is also added to the base oil being selected from the group consisting of citric acid, ascorbic acid, phosphoric acid, monoesters of ascorbic acid, and monoesters of fatty acids. The synergist ranges from about 0.0015 to 0.05% by weight being added to the base oil before any additional components, citric acid being the preferred additive to assist in eliminating oxidation problems.

After the natural oils are combined with the aforesaid antioxidants and synergists, one or more emulsifiers are added to the base oils. The following chemicals are generally chemically similar to the oils and serve to emulsify the added additional constituents in compounding the final compositions. The emulsifiers are oleate esters such as sorbitan monooleates, polyoxyethylene (20) sorbitan monooleates, polyoxyethylene (20) sorbitan trioleates, and polyoxyethylene sorbital hexaoleates. These materials are blended to make the proper emulsifier needed for each blend and to serve as the proper wetting agent required. The preferred emulsifier may consist of a blend of the above materials consisting of 96% polysorbate 80 (sorbitan monooleate) and 4% by weight polyoxyethylene (20) sorbitan monooleate. For the lesser amount of the monooleate, 4% by weight polyoxyethylene (20) sorbitan trioleate or 4% by weight polyoxyethylene sorbital hexaoleate may be substituted. Also, tall oil sorbitan esters can be substituted in place of the oleate ester emulsifier in the same concentrations by weight; however, their use is generally limited to inland drilling operations due to their slightly greater toxicity than the oleate emulsifiers.

The compositions also preferably include an oleate ester type wetting agent which serves to coat all of the subsequent solids which are introduced into the compositions and serve to keep the solids from absorbing water thus keeping the same in the oil phase of the emulsions. A preferred wetting agent is a mixture of 34.3% by weight polyoxyethylene (20) sorbitan monooleate and 31.3% by weight polysorbate 80 (sorbitan monooleate).

A viscosifier such as finely-divided amine-treated bentonite is added to the composition to control viscosity of the composition, the viscosifier preferably ranging in amount of from about 0.5 to 9.5% by weight. Other known viscosifying agents may be substituted for the bentonite as desired or required.

Water, preferably in the form of brine having about 280,000 to 350,000 ppm of dissolved salts, is added to the composition in the amount from about 10 to 30% by weight. The water may contain NaCl and $CaCl_2$ in the ratio of about 1 to 1, or alternatively may contain 0 to 50% by weight NaCl and 50 to 100% by weight $ClCl_2$.

A preferred composition of the natural-oil based drilling fluids may be comprised of the following constituents by weight:

TABLE I

|  | Percent by wt. |
|---|---|
| Plant or Vegetable Oil (Carbon Chain C-12 to C-24) | 96 to 99 |
| Antioxidant or Inhibitor (For plant or vegetable oil) | 0.015 to 2.0 |
| Oleate Emulsifier | 0.25 to 2.0 |

The above composition is of particular utility as a drilling fluid, completion fluid and coring fluid. It may have minor amounts of water such as brine added for various drilling procedures and exhibits a low coefficient of friction less than 0.15. The foregoing emulsifiers and weighting materials may be added to the subject base compositions as desired or required to obtain necessary end use properties.

In another embodiment of the invention, the compositions may be comprised of the following constituents by weight, the filler material being optional depending upon the desired density and viscosity of the final product.

TABLE II

|  | Percent by wt. |
|---|---|
| Plant or Vegetable Oil (Carbon Chain C-12 to C-24) | 20 to 85 |
| Antioxidant for plant or vegetable oil | 0.015 to 3.8 |
| Acid synergist for Antioxidant | 0.0015 to 0.05 |
| Water (Brine having 280,000 to 350,000 ppm of dissolved salts) | 10 to 30 |
| Oleate Emulsifier | 0.25 to 5.0 |
| Oleate Wetting Agent | 0.25 to 5.0 |
| Viscosifier | 0.5 to 9.5 |
| Finely-divided Filler | 0 to 75 |

The above compositions have a low coefficient of friction less than 0.15 and are primarily used as lubricating fluids as well as spotting and packer fluids.

In still another embodiment of the invention, the compositions may be comprised of the following constituents by weight, several additional components being added to control desired end properties of needed density, viscosity and yield strengths.

TABLE III

|  | Percent by wt. |
|---|---|
| Plant or Vegetable Oil (Carbon Chain C-12 to C-24) | 20 to 85 |
| Antioxidant for plant or vegetable oil | 0.015 to 3.8 |
| Acid Synergist for Antioxidant | 0.0015 to 0.05 |
| Water (Brine having 280,000 to 350,000 ppm of dissolved salts) | 2 to 7 |
| Oleate Emulsifier | 0.9 to 2 |
| Oleate Wetting Agent | 0.9 to 2 |
| Sodium Chloride-Calcium Chloride (Ratio about 1 to 1) | 0.25 to 5 |
| Viscoscifier | 0.5 to 9.5 |
| Sodium Sulfate (Co-emulsifier) | 0.25 to 1 |
| Calcium Oxide | 0.25 to 1 |
| Finely-Divided Barite Filler | to 73 |

Below are listed several other minerals which may be substituted for the barite to provide the finely-divided solids, the ranges of weight percentages indicating the preferred amounts of each in the base compositions of Table III.

TABLE IV

| Name | Formula | Specific Gravity | Ranges % by wt. |
|---|---|---|---|
| Altaite | PbTe | 8.15 | 0–38% |
| Anglesite | $PbSO_4$ | 6.37–6.39 | 0–56% |
| Cerussite | $PbCO_3$ | 6.53–6.57 | 0–55% |
| Cotunnite | $PbCl_2$ |  | 0–61% |
| Galena | PbS | 7.57–7.59 | 0–45% |
| Litharge | PbO | 9.14 | 0–31% |
| Minium | $Pb_3O_4$ | 8.9–9.2 | 0–33% |
| Phosgenite | $Pb(CO_3Cl_2)$ | 6.13 | 0–58% |

The above compositions also possess the same low coefficient of friction less than 0.15 and can be used as a lubricating fluid, but also as a spotting fluid, packer fluid, coring fluid and completion fluid.

Below are listed a number of specific examples of packer fluids which are used for packing purposes in well drilling and maintenance.

TABLE V

| Chemical | 8 lb./gal %/wt. | 10 lb./gal %/wt. | 15 lb./gal %/wt. |
| --- | --- | --- | --- |
| Oil | 81.556 | 62.967 | 33.378 |
| Antioxidant | .04 | .03 | .02 |
| Synergist | .004 | .003 | .002 |
| Water | 5.2 | 4.0 | 1.4 |
| Emulsifier | 1.2 | .95 | .6 |
| Wetting Agent | 2.5 | 2.05 | 1.4 |
| Viscosifier | 9.5 | 5.5 | 2.5 |
| Barite | 0.0 | 24.5 | 60.7 |

Below are listed a number of specific examples of spotting fluids which are used in selected areas which require "spotting" in a well bore where unduly great localized levels of friction are encountered such as in arcuate or horizontal directional drilling.

TABLE VI

| Chemical | 8 lb./gal %/wt. | 10 lb./gal %/wt. | 15 lb./gal %/wt. |
| --- | --- | --- | --- |
| Oil | 87.356 | 65.387 | 34.608 |
| Antioxidant | .04 | .03 | .02 |
| Synergist | .004 | .003 | .002 |
| Water | 5.2 | 4.0 | 1.4 |
| Emulsifier | 1.2 | .95 | .60 |
| Wetting Agent | 2.5 | 2.05 | 1.4 |
| Viscosifier | 3.7 | 2.08 | .97 |
| Barite | 0.0 | 25.5 | 61.0 |

Below are listed a number of specific examples of drilling and well completion fluids which are employed both during the drilling operation and sealing in of the well casing for long-term completion of the well installation.

TABLE VII

| Chemical | 8 lb./gal %/wt. | 10 lb./gal %/wt. | 15 lb./gal %/wt. |
| --- | --- | --- | --- |
| Oil | 81.0575 | 60.786 | 32.307 |
| Antioxidant | .05 | .04 | .03 |
| Synergist | .005 | .004 | .003 |
| Viscosifier | 3.86 | 2.76 | 1.26 |
| Water | 6.67 | 5.0 | 2.78 |
| Emulsifier | 1.2 | .95 | .60 |
| Wetting Agent | 2.5 | 2.05 | 1.4 |
| NaCl/CaCl$_2$ | 3.92 | 2.97 | 1.58 |
| Na$_2$SO$_4$ | .45 | .35 | .24 |
| CaO | .29 | .24 | .15 |
| Barite | 0.0 | 24.85 | 59.65 |

If Galena or Altaite are substituted for the barite, their weights would change by the total amounts indicated. No change would be noted for the 8 lb./gal.

| Chemical | 8 lb./gal %/wt. | 10 lb./gal %/wt. | 15 lb./gal %/wt. |
| --- | --- | --- | --- |
| Oil | 81.0575% | 71.716% | 59.03% |
| Galena For Altaite | 0.0 | 13.92 | 32.93 |
| Oil | 81.0575% | 73.216% | 62.13% |
| Altaite | 0.0 | 12.43 | 29.83 |

With regard to the low coefficient of friction, the coefficient of friction (U) between two solids is defined as the (F/W), where F denotes the frictional force and W is the load of force perpendicular to the opposing surfaces. The law governing the coefficient of friction is Amonton's Law which states that U is independent of the apparent area of contact; and with the same load W the force to overcome friction will be the same for a small-area side of a sliding block as for the larger side. Such measurement has been transposed to a lubricity tester such as the Baroid Lubricity Tester for evaluating the lubricity of drilling fluids. The load W is the force with which the test block is pressed against the test ring through the torque arm, the load in inch-pounds being read directly from the torque arm dial. The force F required to slide the block and ring surfaces across one another at a given rate is measured by the number of amperes required to turn the test ring at a prescribed number of revolutions per minute. The coefficient of friction U equals F/W expressed in equivalent units.

The preferred method of formulating the subject compositions consists of the following procedure.

All of the individual mixing and storage tanks and vessels are flushed with the natural base oil or base oil mixtures. The base oil or oils containing minor amounts of antioxidant and synergist materials are contained in a mixing tank and preferably heated to about 93° C. (200° F.) prior to the compounding mixing. A minor amount of the oleate-type emulsifier is added to the base oil with thorough mixing. Then a minor amount of viscosifier preferably consisting of amine-treated bentonite in finely-divided form is introduced into the mixture with thorough mixing. A minor amount of oleate-type wetting agent is incorporated into the mixture with thorough mixing. The mixture is then vigorously shear mixed for a period of not less than about 30 minutes to effect more thorough mixing to form a durable stable oil base drilling fluid composition. A finely-divided filler material such as barite is then optionally added to the mixture to form a stable filled composition. The composition possesses a low coefficient of friction less than about 0.15 for varied drilling purposes. As desired or required, water in the form of brine having about 280,000 to 350,000 ppm of dissolved salts is added to the mixture in an amount varying from 10 to 30 percent by weight to form a water-in-oil emulsion. Additional materials such as sodium sulfate and calcium oxide may be added to the mixture as desired to obtain prescribed chemical and physical properties.

To determine the toxicity of the subject compositions and particularly the base natural oils, tests were conducted on water soluble fractions of the oil. Test results were based on the concentration of the compositions which is lethal to 50% of the live test organisms after 96 hours of continuous exposure. (LC50). Mysid shrimp (mysidopsis bahia), 4 to 6 days oil, were used in the testing.

The test methods and materials were based on modifications of the bioassay test procedures set forth by the American Petroleum Institute (API) Recommended Practice, Standard Procedure for Drilling Fluid Bioassays (API RP 13H 1984), and the paper by Petrazzuolo entitled "Proposed Methodology: Drilling Fluids Toxicity Test for the Offshore Subcategory, Oil and Gas Extraction Industry" (1983). All test equipment was detergent washed, acid soaked and rinsed with deionized water. Artificial seawater used in the bioassays was made by mixing commercial synthetic sea salts and deionized water to a final salinity of 20 parts per thousand. If the artificial seawater was prepared more than 48 hours before test usage, it was stored in a darkened chamber at 2° to 4° C. and circulated to prevent salinity stratification during storage.

The test mysid shrimp were cultured from U.S.E.P.A. Rhode Island stock. The mysids were acclimated to a temperature of 20° C. and a salinity of 20±2 parts per thousand from the time of collection. During acclimation and testing, the mysids were fed 2-day old brine shrimp. Standard toxicant testing with sodium lauryl sulfate yielded a 96-hour LC50 of 4.4 ppm, with a 95% confidence interval of 3.7 to 5.1 ppm.

An oil-based composition selected from Table VI was taken for test purposes and kept sealed after preparation until mixed with seawater at test initiation.

A 1:9 mixture of the 10 lb./gal. example of oil and artificial seawater from Table VI was prepared by vigorous and continuous stirring of 1.0 liter of the oil with 9.0 liters of seawater in a clean 5-gallon narrow-mouth glass bottle for 10 minutes to provide thorough mixing while minimizing the loss of valatiles. The mixture was allowed to sit for one hour to allow the oil layer to separate out on top of the aqueous layer. The water soluble fraction (WSF), or saturated aqueous phase, was then siphoned from beneath the oil layer into a clean container. Test solutions of 10%, 18%, 32% 56%, and 100% of the WSF were prepared by dilution of the 100% WSF with artificial seawater, as necessary. Three replicate dishes, each containing 20 mysid shrimp in one liter of solution, were assigned to each test concentration and the control. Survival counts of shrimp were counted after 0, 24, 48, 72 and 96 hours in all test dishes.

With regard to the test series, temperature, dissolved oxygen, salinity and pH were measured at 24-hour intervals for each of the test dishes. Temperatures were maintained at 21° C.±1° C. and salinities were 20°+1°/oo during testing. The dissolved oxygen concentration remained at acceptable levels with aeration beginning at test initiation. The pH ranged from 7.6 to 8.1.

Survival of shrimp in the WSF bioassays was compared to control survival by use of the student's t-test. If survival in any of the bioassays was less than 50%, 96-hour LC50's were calculated by the method of Stephan (1982) and the appropriate LC50 selected.

The results of the bioassays are given in the following Table VIII. Survival of the control organisms was 91.8%. Survival in none of the bioassays was significantly less than control survival or less than 50%. The 96-hour LC50 could not be calculated but would be greater than 100% (1,000,000 ppm) WSF.

TABLE VIII

| Concentration | | |
|---|---|---|
| % Phase | ppm Phase | Percent Survival |
| 100 | 1,000,000 | 85.0 |
| 56 | 560,000 | 86.7 |
| 32 | 320,000 | 98.3 |
| 18 | 180,000 | 88.3 |
| 10 | 100,000 | 93.3 |
| 0 (Control) | | 91.8 |

The foregoing table indicates the 96-hour survival of mysid shrimp (mysidopsis bahia) exposed to the water soluble fraction of the natural oil sample. The data clearly show the non-toxic character of the drilling fluids with regard to their non-deleterious effect on sensitive marine life.

Various modifications of the invention may be resorted to within the spirit and scope of the appended claims.

I claim:

1. The process for the preparation of a non-polluting non-toxic plant or vegetable oil base drilling fluid composition comprising the steps of:
   (a) introducing a plant or vegetable base oil having a C-12 to C-24 carbon chain into a mixing container,
   (b) adding a minor amount of antioxidant to said base oil,
   (c) adding a minor amount of a synergist for said antioxidant, said synergist being selected from the group consisting of citric acid, ascorbic acid, phosphoric acid, monoesters of ascorbic acid and monoesters of fatty acids, to said base oil,
   (d) heating the said base oil including said antioxidants to a temperature of about 93° C. (200° F.),
   (e) introducing a minor amount of an oleate ester emulsifier into said base oil with thorough mixing,
   (f) adding a minor amount of viscosifier consisting of amine-treated bentonite into said mixture with thorough mixing,
   (g) introducing a minor amount of an oleate ester wetting agent into said mixture with thorough mixing,
   (h) shear mixing of the mixture for a period of not less than about 30 minutes to effect more thorough mixing to form a stable emulsion, and
   optionally (i) adding a finely-divided filler material into said mixture with thorough mixing to form a stable oil base drilling fluid composition having a low coefficient of friction less than about 0.15 for varied drilling purposes.

2. The process in accordance with claim 1 including the step of:
   (j) adding water in the form of brine water having about 280,000 to 350,000 ppm of dissolved salts in an amount of about 10 to 30 percent by weight to said mixture intermediate steps (f) and (g) with thorough mixing.

3. The process in accordance with claim 1, wherein in step (i) finely-divided barite is added to the mixture as the filler material.

4. The process in accordance with claim 1 wherein in step (a) the said plant or vegetable oil is selected from the group consisting of peanut oil, rapeseed oil, soybean oil, sunflower oil, corn oil, cottonseed oil, rice bran oil, safflower oil, castor bean oil, palm oil, and mixtures thereof.

5. The process in accordance with claim 1, wherein in step (b) the said antioxidant is added in an amount ranging from about 0.015 to 3.8 percent by weight intermediate steps (a) and (c).

6. The process in accordance with claim 1, wherein in step (a) said plant or vegetable oil comprises essentially extended long-chain carboxylic acids having minimal double and triple carbon bonds.

* * * * *